United States Patent
Gerlach et al.

(10) Patent No.: US 10,290,173 B1
(45) Date of Patent: May 14, 2019

(54) MODULAR LOCKER SYSTEM

(71) Applicant: NCR Corporation, Duluth, GA (US)

(72) Inventors: Tim Gerlach, Walnut Creek, CA (US); Tomasz Kruczek, Fremont, CA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/940,790

(22) Filed: Mar. 29, 2018

(51) Int. Cl.
*A47B 47/00* (2006.01)
*A47B 87/02* (2006.01)
*E05B 47/02* (2006.01)
*G05B 15/02* (2006.01)
*G07F 17/12* (2006.01)

(52) U.S. Cl.
CPC .......... *G07F 17/12* (2013.01); *A47B 47/0091* (2013.01); *A47B 87/0284* (2013.01); *A47B 47/0016* (2013.01); *A47B 2220/0091* (2013.01); *E05B 47/02* (2013.01); *G05B 15/02* (2013.01)

(58) Field of Classification Search
None
See application file for complete search history.

(56) References Cited

U.S. PATENT DOCUMENTS

2003/0025590 A1* 2/2003 Gokcebay .............. G06Q 40/04
340/5.73
2005/0264397 A1* 12/2005 Coelho .................. G06Q 10/02
340/5.28
2017/0270947 A1* 9/2017 Zhan ....................... H04W 4/80

\* cited by examiner

*Primary Examiner* — Carlos Garcia
(74) *Attorney, Agent, or Firm* — Schwegman, Lundberg & Woessner

(57) ABSTRACT

Disclosed is a modular locker system. The modular locker system may include a plurality of slave lockers and a control cube. Each of the plurality of slave lockers may have a slave processing unit. The control cube may have a master processing unit electrically coupled to the slave processing unit of each of the plurality of slave lockers. The control cube may be configured to: receive a customer code, and transmit an unlock command to one of the plurality of slave lockers in response to receiving the customer code.

13 Claims, 5 Drawing Sheets

MODULAR LOCKER SYSTEM

SUMMARY

Disclosed is a modular locker system. The modular locker system may include a plurality of slave lockers and a control cube. Each of the plurality of slave lockers may have a slave processing unit. The control cube may have a master processing unit electrically coupled to the slave processing unit of each of the plurality of slave lockers. The control cube may be configured to: receive a customer code and transmit an unlock command to one of the plurality of slave lockers in response to receiving the customer code.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
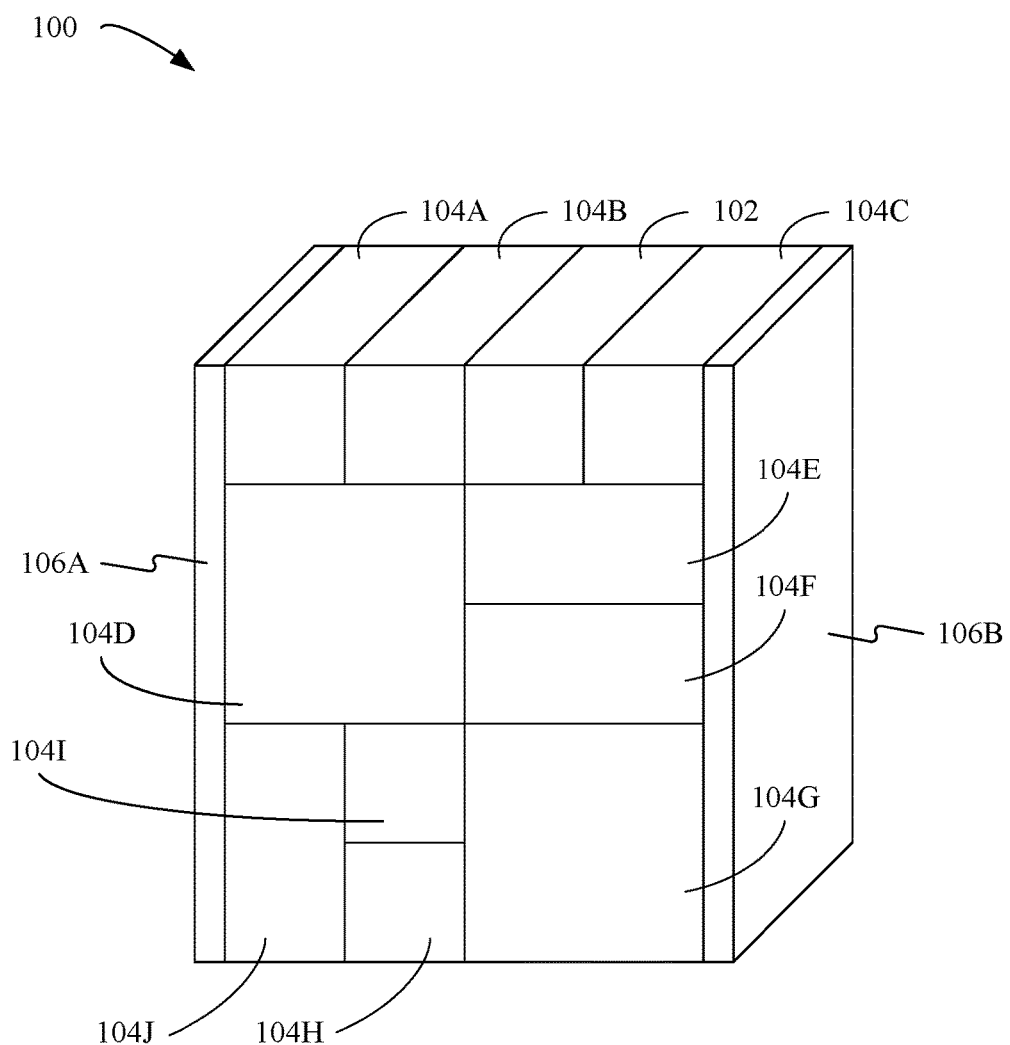
FIG. 1 shows an example modular locker system consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit this disclosure. Instead, the proper scope of any invention disclosed herein is defined by the appended claims.

Today's bank branches and retail stores may be looking to expand the way products and services are delivered. In retail, this may mean either going to a brick and mortar store and picking goods from a shelf or shopping online and having goods delivered. Bank is may be similar. As disclosed herein, there may be a middle ground between the total online shopping experience and the total brick and mortar store shopping experience. For example, the customer may begin a shopping experience online or via a mobile device. The shopping experience may be completed at a location and time that is convenient to the customer through the use of the smart lockers disclosed herein.

Bank branches and retail stores have different sizes, capacity, and location constraints. For example, stores or bank branches may have limited space for tellers or checkout lanes. By using the smart lockers disclosed herein, the banks and stores may increase the number of customers that can be serviced within the same, similar, and possible smaller footprint. For example, multiple smart lockers may be placed on a countertop or at existing teller or cashier lines. The smart lockers may allow a customer to retrieve purchased products or withdrawn cash without having to interact with a cashier or teller and using less square footage of a store or bank. The number of smart lockers may depend on the size of the establishment and the number of customers expected.

As disclosed herein, smart lockers may be modular and designed for easy configurations and installation. For example, a base locker size may be considered as one unit. For instance, the base locker size may have a width and height of 1 foot and a depth of 2 feet. Other lockers may be integer multiple sizes of the base locker size. For example, a medium locker may have a width of 2 feet, a height of 1 foot and a depth of 2 feet. A large locker may have a width, height, and depth of 2 feet. In addition, a locker may be other multiples of the unit size.

Each of the smart lockers may be electrically couple to one another and to a control cube. The control cube may fit within an array formed by the smart lockers because the control cube may be the same size as the base locker size. For example, the control cube may have a height and width of 1 foot and a depth of 1 foot or 2 feet. Each of the smart lockers and the control cube may include electrical interfaces that allow the smart lockers and control cube to electrically couple to one another. For example, each of the smart lockers and the control cube may include a serial port interface that allows each to be connected to one another. Other interfaces such as, parallel ports, near field communication (NFC), Wi-Fi, etc. may be used to electrically couple the smart lockers together or to the control cube as disclosed herein.

FIG. 1 shows an example modular locker system 100 consistent with this disclosure. As shown in FIG. 1, modular locker system 100 may include a control cube 102 and smart lockers 104 (distinctive lockers denoted as 104A, 104B, etc.) Smart lockers 104 also may be referred to as slave lockers herein. As shown in FIG. 1, smart lockers 104 and the control cube 102 may be arranged in an array. While FIG. 1 shows the array as a rectangular array, the array may be any shape. For example, smart lockers 104A, 104B, and 104D may be removed from the array to form an additional configuration of the smart lockers 104.

As shown in FIG. 1, smart lockers 104 can be arranged in any fashion. For example, a larger smart locker, such a smart locker 104G may be located close to the bottom of the array and a larger smart locker, such as smart locker 104D may be located close to the top of the array. As a result, a larger smart locker may be available and specifically reserved for use with customers that have a disability. This helps to ensure that the modular locker system 100 is compliant with any laws concerning providing access to people with disabilities. In addition, smart locker 104G may also be used for larger items and smart locker 104D may be use when a person orders a lot of items.

While FIG. 1 shows control cube 102 located at the top of the array, the control cube 102 may be located anywhere within the array. For example, control cube 102 may be swapped with smart locker 104I. This configuration may allow for control cube 102 to be located lower to the ground and thus accessible by people in wheelchairs.

Control cube 102 may be a unit size. Smart lockers 104 may be sized in integer multiples of control cube 102. For example, control cube 102 may have a width and height that are one unit. Smart lockers 104A, 104B, 104C, 104H, and 104I may have a width and height that are one unit. Smart lockers 104E and 104F may have a width that is two units and a height that is one unit. Smart locker 104J may have a width that is one unit and a height that is two units. Smart lockers 104D and 104G may have a width and height that are two units. While FIG. 1 shows the depth of control cube 102 and smart lockers 104 as being equal, the depth of each of smart lockers 104 may be the same or different than that of control cube 102. Non-limiting examples of a unit size include 1 foot, 200 mm, 10 inches, etc.

Modular locker system 100 may also include side panels 106A and 106B (collectively side panels 106). Side panels 106 may be used to electrically couple one or more rows of smart lockers 104 as disclosed herein. For example, side panels 106 may be used to provide a wired connection that connects smart locker 104C to smart locker 104E, smart locker 194A to smart locker 104D, etc. Side panels 106 may be used when modular locker system 100 is freestanding and thus may provide electrical connections between the smart lockers as well as a finished side for modular locker system 100. When modular locker system 100 is embedded within a wall or other structure, side panels 106 may or may not be used to provide a connection between the various rows of smart lockers 104.

Figure 2A:
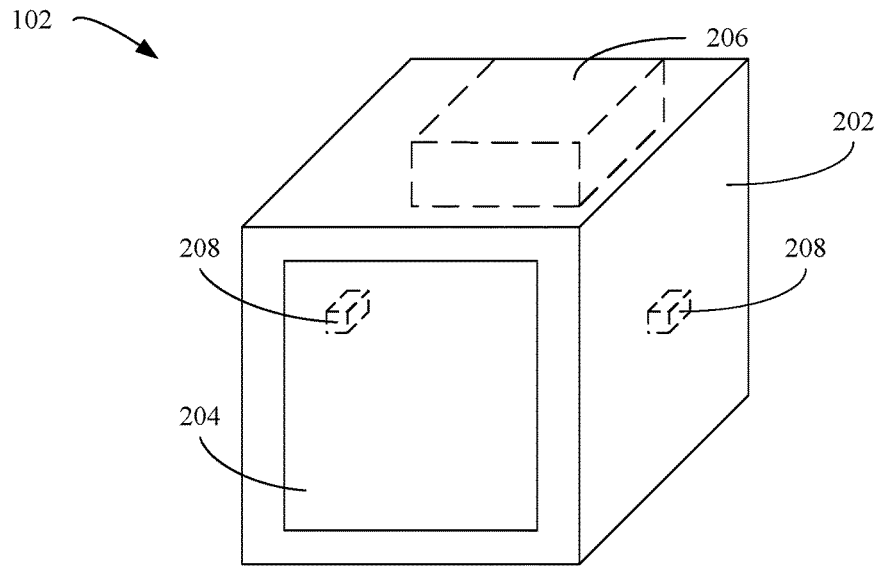
FIGS. 2A and 2B show an example schematic of a control cube consistent with this disclosure.
Figure 2B:
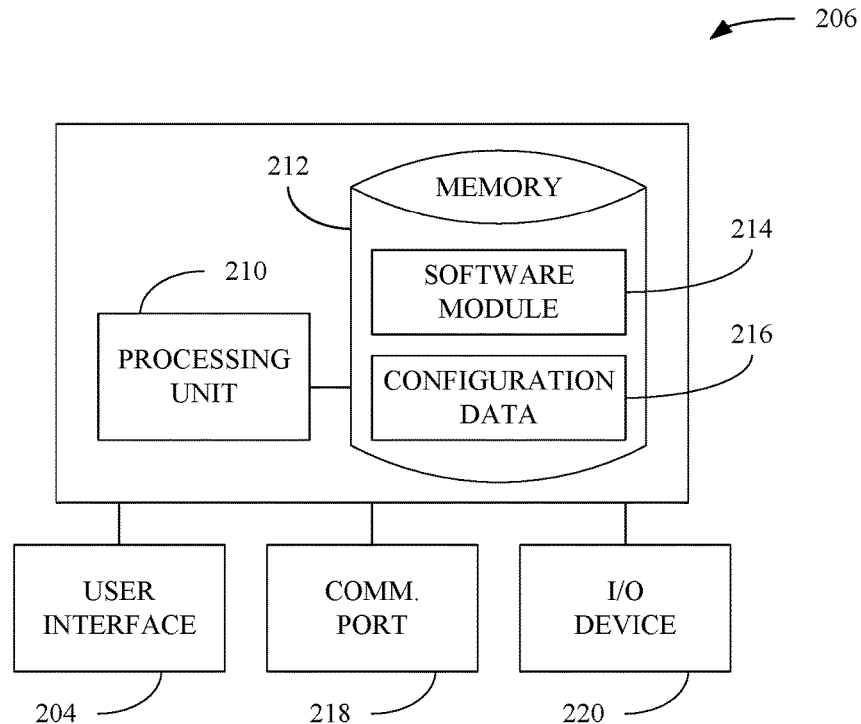

FIGS. 2A and 2B show an example schematic of control cube 102. As shown in FIG. 2A, control cube 102 may include a body 202, a user interface 204, and a computing device 206. Connectors 208 may be implanted within sidewalls of the body 202. While FIG. 2A shows two single connectors, one or more than two connectors may be located in one or more sidewalls. Connector 208 may allow control cube 102 to electrically couple to one or more of the smart lockers 104.

Computing device 206 is shown in greater detail in FIG. 2B. Computing device 206 may include a processing unit 210 and a memory 212. The memory 212 may include a software module 214 and configuration data 216. While executing on processing unit 210, the software module 214 may perform processes for configuring and operating modular locker system 100, including, for example, one or more stages included in a method 500 described below with respect to FIG. 5.

As disclosed herein, configuration data 216 may include locker IDs, size information, capacity information, current usage status, status of a lock, etc. for each of the smart lockers 104. For example, the capacity and size information may relate to how much stuff or a maximum size of an article that might fit within a smart locker. The current usage status may relate to whether or not items are current in a smart locker waiting to be retrieved by a customer. The usage status may be monitored and the customer or store personnel notified if an item has not been retrieved after a preset amount of time. For instance, if an item has been in a smart locker for more than one week, two weeks, etc., the customer may be notified that his or her item is awaiting pickup and will be returned if not received within the next seven days, etc. In addition, store personnel also may be notified that the item has not been retrieved. The store personnel may then retrieve the item so that the smart locker can be used for other customers. The lock status may allow store personnel to be notified when a smart locker is unintentionally left unlocked or otherwise in an unsecured state.

The computing device 206 may be electrically coupled to user interface 204. User interface 204 may act as a user interface that may include any number of devices that allow a user to interface with the control cube 102. User interface 204 may allow store personnel to open the smart lockers to place items customers have purchased inside the smart lockers. While FIG. 2A shows a single user interface on the front of control cube 102, control cube 102 may include a second user interface located on the back of control cube 102. The second user interface may allow employees to open a second door located on the back of the smart lockers. For instance, when modular locker system 100 is built into a wall, the second user interface, which may be a remote tablet or other computing device used by an employee, may allow personnel to operate the back doors of the smart lockers without having to be in front of the modular locker system 100. This increases security in a banking environment where personnel may be placing cash in the smart lockers 104. Thus, the bank personnel may be able to place or retrieve large amounts of cash in the smart lockers 104 while located in a secured area instead of a public space such as a bank lobby.

During use, user interface 204 may display instructions for the customer. For example, user interface 204 may instruct the customer to enter identifying information. In addition, user interface 204 may instruct the customer as to which smart locker has the customer's items once the identifying information is received and verified by control cube 102.

User interface 204 may include a keypad, a display (touchscreen or otherwise), etc. In addition, user interface 204 may include audio equipment such as speakers, a microphone, a headphone jack, etc. that may be used to allow a customer or employee to interface with control cube 102.

Control cube 102 may also include a communications port 218. Communications port 218 may allow control cube 102 to communicate with various information sources, such as, but not limited to, smart lockers 104, remote computing devices such as servers, bank teller computers, etc. As disclosed herein, communications port 218 may be wired or wireless. In addition, communications port 218 may be electrically coupled to connector 208 such that control cube 102 may be connected to smart lockers 104 via a wired connection. Non-limiting examples of communications port 218 include, Ethernet cards (wireless or wired), Bluetooth® transmitters and receivers, near-field communications modules, serial port interfaces, etc.

Control cube 102 may also include an input/output (I/O) device 220. I/O device 220 may allow control cube 102 to receive and output information. Non-limiting examples of I/O device 220 include, a camera (still or video), a printer, a scanner, biometric readers, etc. For example, I/O device 220 may include a camera or scanner that can be used to scan barcodes on a mobile device or a biometric reader that captures a user's finger print, facial scan, etc. of a customer that wants to retrieve items from one of smart lockers 104. I/O device 220 may also include a printer that can be used to print customer receipts, etc.

Computing device 206 may be a master serial protocol interface (SPI) device. Connectors 208 may be SPI ports that allow the various smart lockers 104 to be connected to control cube 102 in series. As disclosed herein, during installation of modular locker system 100, an identification message may originate from control cube 102 and be passed in series to each of the smart lockers 104. As the identification message passes from one smart locker to the next, a locker ID may be added to the identification message by the respective smart locker to create an updated identification message. The updated identification message may be passed and updated by each of the smart lockers 104 until it is returned to control cube 102. Stated another way, control cube 102 may be connected to smart lockers 104 in a daisy chain fashion.

Control cube 102 may also be connected to smart lockers 104 via a parallel connection, wireless connections, etc. For example, control cube 102 and smart lockers 104 may each include a Wi-Fi or Bluetooth module. Control cube 102 may transmit to and receive messages from smart lockers 104 via Wi-Fi or Bluetooth signals.

Figure 3A:
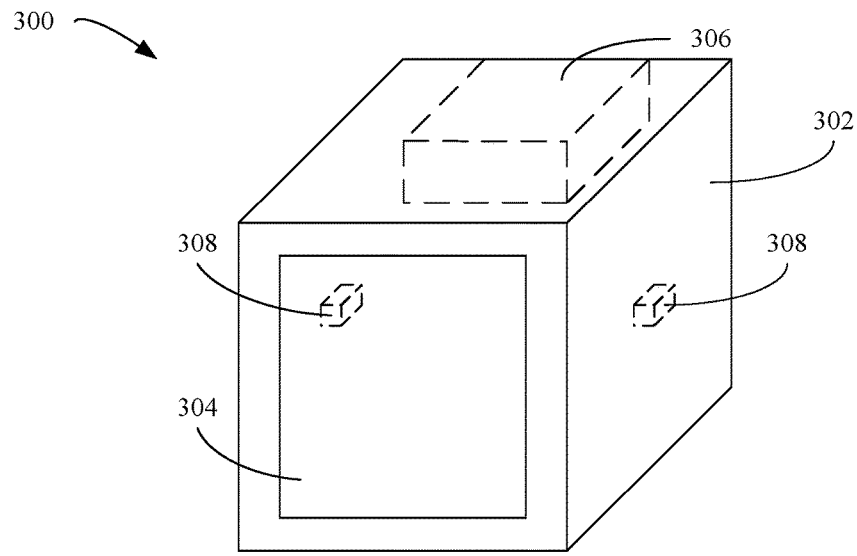
FIGS. 3A and 3B show an example schematic of a smart locker consistent with this disclosure.
Figure 3B:
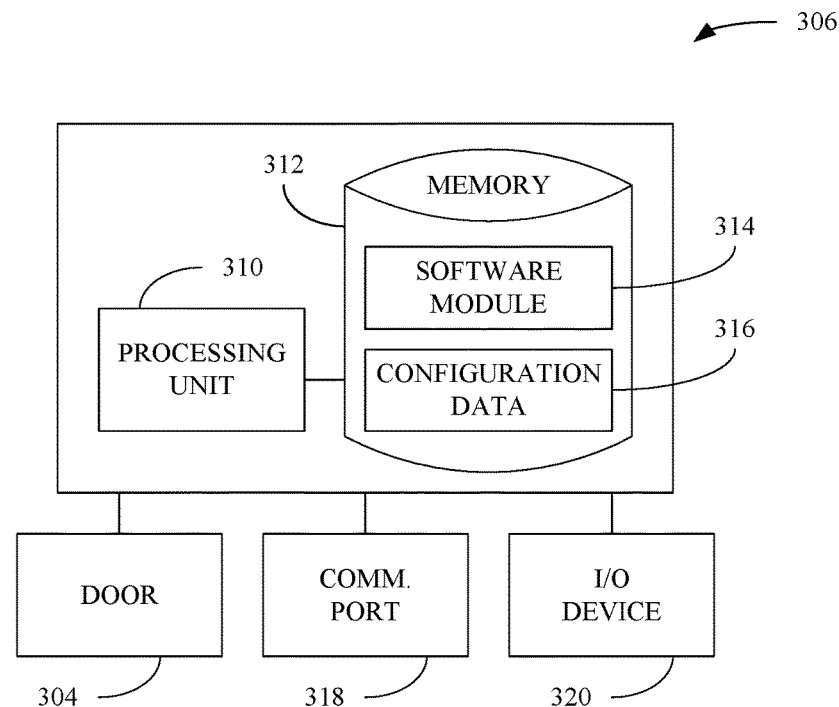

FIGS. 3A and 3B show an example schematic of a smart locker 300, such any one of smart lockers 104. As shown in FIG. 3A, smart locker 300 may include a body 302, a door 304, and a computing device 306. Connectors 208 may be implanted within sidewalls of the body 302. While FIG. 3A shows two connectors, one or more than two connectors may be located in one or more sidewalls. Connectors 308 may allow smart locker 300 to electrically couple to one or more of the smart lockers 104 and control cube 102.

Computing device 306 is shown in greater detail in FIG. 3B. Computing device 306 may include a processing unit 310 and a memory 312. The memory 312 may include a software module 314 and configuration data 316. While executing on processing unit 310, the software module 314 may perform processes for configuring and operating modular locker system 100, including, for example, one or more stages included in a method 500 described below with respect to FIG. 5.

As disclosed herein, configuration data 316 may include locker IDs, size information, capacity information, current usage status, status of a lock, etc. for each of smart locker 300. For example, the capacity and size information may relate to how much stuff or a maximum size of an article that might fit within a smart locker. The current usage status may relate to whether or not items are current in a smart locker waiting to be retrieved by a customer. The usage status may be monitored and the customer or store personnel notified if an item has not been retrieved after a preset amount of time. For instance, if an item has been in a smart locker for more than one week, two weeks, etc., the customer may be notified that his or her item is awaiting pickup and will be returned if not received within the next seven days, etc. In addition, store personnel also may be notified that the item has not been retrieved. The store personnel may then retrieve the item so that the smart locker can be used for other customers. The lock status may allow store personnel to be notified when a smart locker is unintentionally left unlocked or otherwise in an unsecured state.

During use, processing unit 310 may transmit configuration data and usage information to control cube 102, which can be displayed via user interface 204 to employees or customers. For example, when smart locker 300 contains product, processing unit 310 may transmit a status to control cube 102 to show smart locker 300 contains product and what that product is.

Smart locker 300 may also include a communications port 318. Communications port 318 may allow smart locker 300 to communicate with various information sources, such as, but not limited to, smart lockers 104 and control cube 102. As disclosed herein, communications port 318 may be wired or wireless. In addition, communications port 318 may be electrically coupled to connector 308 such that smart locker 300 may be connected to other smart lockers 104 and control cube 102 via a wired connection. Non-limiting examples of communications port 318 include, Ethernet cards (wireless or wired), Bluetooth® transmitters and receivers, near-field communications modules, serial port interfaces, etc.

Smart locker 300 may also include an input/output (I/O) device 320. I/O device 320 may allow smart locker 300 to receive and output information. Non-limiting examples of I/O device 320 include, a camera (still or video), a scanner, biometric readers, etc. For example, I/O device 320 may include a camera that captures an image of a customer when products are retrieved from smart locker 300. I/O device 320 may also include a printer that can be used to print customer receipts, etc. For example, a receipt may be printed when the customer retrieved his or her product. The receipt may include a time the product was received and any other identifying information. The receipt may be printed for the customer, employee, or both.

Computing device 306 may be a slave serial protocol interface (SPI) device. Connectors 308 may be SPI ports that allow smart locker 300 to be connected to control cube 102 and other smart lockers in series. As disclosed herein, during installation of modular locker system 100, an identification message may originate from control cube 102 and be passed in series to each of the smart lockers 104 in series. As the identification message passes from one smart locker to the next, a locker ID may be added to the identification message by the respective smart locker to create an updated identification message. The updated identification message may be passed and updated by each of the smart lockers 104 until it is returned to control cube 102. Stated another way, smart lockers 104 may be connected to control cube 102 in a daisy chain fashion.

Computing device 306 may also monitor door 304. For example, computing device 306 may monitor 304 to determine if and when door 304 is opened by a customer or if door 304 is unlocked. For instance, a customer may retrieve an item and not close door 304 completely. By monitoring door 304, computing device 306 may notify control cube 102, employees or bank personnel that door 304 is not closed/locked.

Figure 4:
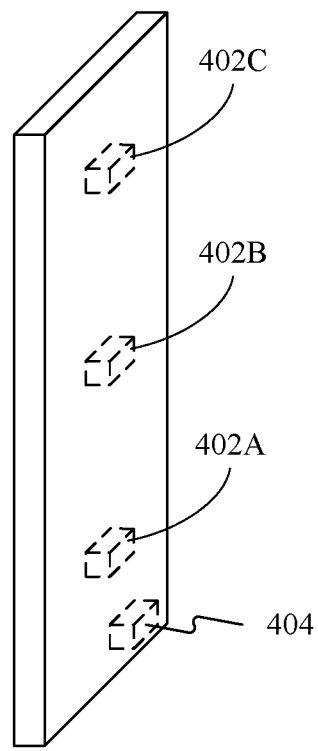
FIG. 4 shows an example schematic of a side panel consistent with this disclosure.

FIG. 4 shows and example schematic of a side panel 400, such as side panel 106A or 106B. Side panel 400 may include one or more electrical connections 402A, 402B, and 402C (collectively electrical connections 402). Electrical connections 402 may be flex printed circuit board (PCB) connectors that may include a microcontroller. Electrical connections 402 may allow side panel 400 to electrically couple smart lockers 104 and control cube 102. For example, as shown in FIG. 1, side panel 106B couples smart locker 104C to smart locker 104E and smart locker 104F to smart locker 104G. Side panel 106B may also couple smart locker 104E to smart locker 104F. In addition, side panel 106B also may connect a bottom and a top connector of large smart locker 104G together. For example, when a smart locker, such as smart locker 104G is taller than one-unit size, it may have two connectors located at standard locations as within each half of the height. For instance, since smart locker 104G is taller than a single row then smart locker 104G may have two interfaces 308 and only the top interface 308 may be connected to computing device 306 while all others connectors simply pass through in the same row.

Smart locker 400 may also include a termination point 404. Termination point 404 may close a SPI connection. In addition, termination point 404 may include a microcontroller that may be used to indicate the end of a row to control cube 102. The microcontroller may be similar to computing device 306 as described above with regard to FIGS. 3A and 3B. The microcontroller for side panel 400 may include a memory that stores configuration data for the side panel 400. For example, the configuration data for the side panel may include a number of electrical connections 402 and which, if any, of the electrical connections 402 are being utilized in the modular locker system 100.

Figure 5:
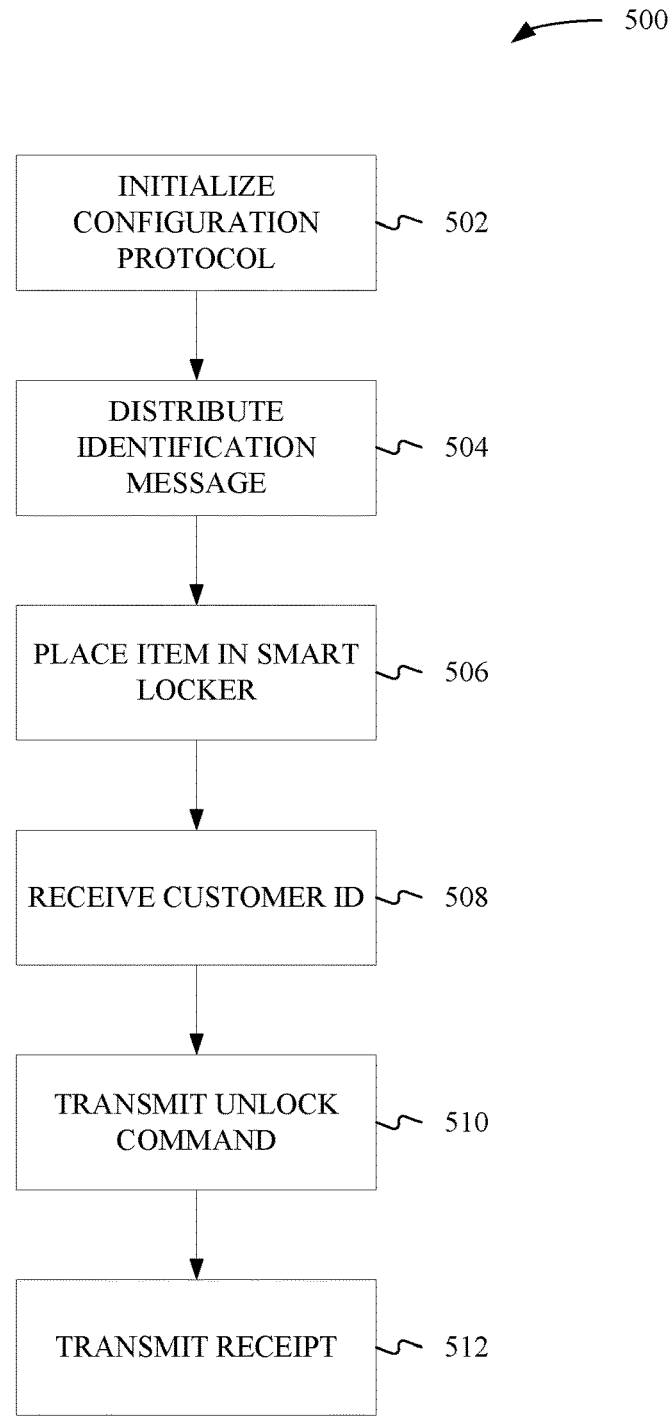
FIG. 5 shows an example method consistent with this disclosure.

FIG. 5 shows an example method 500 consistent with this disclosure. Method 500 may begin at stage 502 where configuration protocol is initialized. The configuration protocol may be initialized when the modular locker system 100 is first installed or whenever a configuration change has been made to the modular locker system 100. For example, if a smart locker is found to have a defect or other malfunction, it may be replaced with a new smart locker and the configuration protocol may be executed again. In addition, the arrangement of smart locker 104 may be changed and thus, the modular locker system 100 may need to be reconfigured.

From stage 502 method 500 may proceed to stage 504 where an identification message may be distributed. As disclosed herein, the identification message may originate from control cube 102. Control cube 102 may transmit the identification message to one of the smart lockers 102. Distribution of the identification message may include each of smart lockers 104 passed the identification message from one smart locker to an adjacent smart locker thus linking smart lockers 104 to control cube 102 in a daisy chained manner. For instance, control cube 102 may generate the identification message and transmit it to smart locker 104C. Smart locker 104B may add its locker ID to the identification message to create an updated identification message. The updated identification message may then be transmitted to smart locker 104A. The updated identification message may be transmitted to each of smart lockers 104. Each of smart lockers 104 may have a hardcoded locker ID or the locker ID may be randomly generated by the processing device of each smart locker.

From stage 504 method 500 may proceed to stage 506 where an item may be placed in a smart locker. Placing an item in a smart locker, such as smart locker 300, may include physically placing the item in the smart locker and registering usage of the smart locker with control cube 102. For example, a customer may wish to withdraw cash and a bank employee may place the cash in a smart locker. When the bank employee places the cash in the smart locker, the bank employee may interface with control cube 102 via a portable computing device (e.g., a tablet computer) or a desktop computer owned by the bank. To register usage of the smart locker, the bank employee may enter a time and how much cash was deposited into the smart locker as well as which smart locker the cash was deposited into.

Once an item is placed in the smart locker the customer may then retrieve the item. From stage 506 method 500 may proceed to stage 508 where a customer ID may be received. The customer ID may include a username and password for the customer that wants to retrieve the product in the smart locker. For example, once the bank personnel has placed the cash in the smart locker, a message may be transmitted to the customer notifying him or her that the order is ready to be picked up. Once the customer reaches the bank, he or she may enter his or her username and password, which may be a one-time username and password, into control cube 102, either via a mobile device or via user interface 204). The customer ID may also include additional information that may be used to identify the customer. For instance, for a cash withdrawal, the customer may also have to include the amount of cash being withdrawn. This additional information may add an increased level of security as it is unlikely that an unauthorized user who happens to have the customer's username and password will also know the amount of cash the customer requested. The customer's username may be an account number, a one-time username and/or password assigned by the bank for the particular transaction, etc.

Once the customer ID is entered, method 500 may proceed to stage 510 where control cube 102 may transmit an unlock code to one of smart lockers 104. For example, after the customer has entered his or her customer ID, control cube 102 may transmit a message to the customer's mobile device or display on user interface 204 a number identifying which smart locker contains the customer's item while simultaneously transmitting an unlock command to the computing device of the particular smart locker. The computing device of the smart locker may then transmit the unlock command to a lock associated with the door to unlock the smart locker so the customer may retrieve the products in the smart locker.

From stage 510 method 500 may proceed to stage 512 were a receipt may be transmitted. For example, once the customer retrieves the product, the smart locker may transmit a message to control cube 102 indicated the product has been retrieved. Control cube 102 may then transmit the receipt to a server or other central computer so that the bank or merchant has a record showing the product was retrieved. In addition, server or other central computer may transmit a copy of the receipt to the customer so the customer has a record showing the product was received.

EXAMPLES

Example 1 is a control cube of a modular locker system comprising a plurality of slave lockers, the control cube comprising: a processor; and a memory storing instructions that, when executed by the processor, cause the processor to: receive a customer code, and transmit an unlock command to one of a plurality of slave lockers in response to receiving the customer code.

In Example 2, the subject matter of Example 1 optionally includes wherein the control cube defines a unit size and each of the plurality of slave lockers are an integer multiple of the unit size.

In Example 3, the subject matter of any one or more of Examples 1-2 optionally include wherein the instructions, when executed by the processor, further cause the processor to receive an identification message from one of the plurality of slave lockers, the identification message include a locker ID for each of the plurality of slave lockers.

In Example 4, the subject matter of any one or more of Examples 1-3 optionally include wherein the control cube includes a serial port configured to allow the control cube to be electrically coupled to the plurality of slave lockers.

In Example 5, the subject matter of any one or more of Examples 1-4 optionally include wherein the control cube configured to receive the customer code includes the control cube having a user interface configured to receive the customer code.

Example 6 is a slave locker comprising: a lock; a processor; and a memory storing instructions that, when executed by the processor, cause the processor to: receive an unlock command from a control cube in electrical communication with the slave locker, and transmit an unlock command to the lock.

In Example 7, the subject matter of Example 6 optionally includes wherein the instructions, when executed by the processor, further cause the processor to: receive an identification message from a second slave locker; add a locker ID to the identification message to create an updated identification message; and transmit the updated identification message to a third slave locker.

In Example 8, the subject matter of any one or more of Examples 6-7 optionally include wherein the slave locker is an integer multiple of a unit size defined by the control cube.

In Example 9, the subject matter of any one or more of Examples 6-8 optionally include a serial port configured to allow the slave cube to be electrically coupled to at least one other slave locker.

In Example 10, the subject matter of any one or more of Examples 6-9 optionally include wherein the slave locker is one of a plurality of slave lockers arranged in an array around a control cube.

Example 11 is a modular locker system comprising: a plurality of slave lockers, each of the plurality of slave lockers having a slave processing unit; and a control cube having a master processing unit electrically coupled to the slave processing unit of each of the plurality of slave lockers, the control cube configured to: receive a customer code, and transmit an unlock command to one of the plurality of slave lockers in response to receiving the customer code.

In Example 12, the subject matter of Example 11 optionally includes wherein each of the plurality of slave lockers is configured to: receive an identification message from another of the plurality of slave lockers; add a locker ID to the identification message to create an updated identification message; and transmit the updated identification message to an adjacent slave locker.

In Example 13, the subject matter of any one or more of Examples 11-12 optionally include wherein the control cube defines a unit size and each of the plurality of slave lockers are an integer multiple of the unit size.

In Example 14, the subject matter of any one or more of Examples 11-13 optionally include wherein the control cube is electrically coupled to the slave processing unit of each of the plurality of slave lockers via a serial protocol interface connection.

In Example 15, the subject matter of any one or more of Examples 11-14 optionally include wherein the control cube is electrically coupled to the slave processing unit of each of the plurality of slave lockers via a near field communication connection.

In Example 16, the subject matter of any one or more of Examples 11-15 optionally include wherein the control cube configured to receive the customer code includes the control cube configured to receive the customer code from a mobile device of a customer.

In Example 17, the subject matter of any one or more of Examples 11-16 optionally include wherein the control cube configured to receive the customer code includes the control cube configured to receive the customer code from a keypad associated with the control cube.

In Example 18, the subject matter of any one or more of Examples 11-17 optionally include a least one side panel configured to electrically couple a first subset of the plurality of slave lockers to a second subset of the plurality of slave lockers.

In Example 19, the subject matter of any one or more of Examples 11-18 optionally include the control cube is located within an array formed by the plurality of slave lockers.

In Example 20, the subject matter of any one or more of Examples 11-19 optionally include wherein the control cube is a locker.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A slave locker comprising:
a lock;
a processor; and
a memory storing instructions that, when executed by the processor, cause the processor to:
receive an identification message from a second slave locker,
add a locker ID to the identification message to create an updated identification message,
transmit the updated identification message to a third slave locker,
receive an unlock command from a control cube in electrical communication with the slave locker, and
transmit an unlock command to the lock.

2. The slave locker of claim 1, wherein the slave locker is an integer multiple of a unit size defined by the control cube.

3. The slave locker of claim 1, further comprising a serial port configured to allow the slave cube to be electrically coupled to at least one other slave locker.

4. The slave locker of claim 1, wherein the slave locker is one of a plurality of slave lockers arranged in an array around a control cube.

5. A modular locker system comprising:
a plurality of slave lockers, each of the plurality of slave lockers having a slave processing unit, wherein each of the plurality of slave lockers is configured to:
receive an identification message from another of the plurality of slave lockers,
add a locker ID to the identification message to create an updated identification message, and
transmit the updated identification message to an adjacent slave locker; and
a control cube having a master processing unit electrically coupled to the slave processing unit of each of the plurality of slave lockers, the control cube configured to:
receive a customer code, and
transmit an unlock command to one of the plurality of slave lockers in response to receiving the customer code.

6. The modular locker system of claim 5, wherein the control cube defines a unit size and each of the plurality of slave lockers are an integer multiple of the unit size.

7. The modular locker system of claim 5, wherein the control cube is electrically coupled to the slave processing unit of each of the plurality of slave lockers via a serial protocol interface connection.

8. The modular locker system of claim 5, wherein the control cube is electrically coupled to the slave processing unit of each of the plurality of slave lockers via a near field communication connection.

9. The modular locker system of claim 5, wherein the control cube configured to receive the customer code includes the control cube configured to receive the customer code from a mobile device of a customer.

10. The modular locker system of claim 5, wherein the control cube configured to receive the customer code includes the control cube configured to receive the customer code from a keypad associated with the control cube.

11. The modular locker system of claim 5, further comprising a least one side panel configured to electrically couple a first subset of the plurality of slave lockers to a second subset of the plurality of slave lockers.

12. The modular locker system of claim 5, the control cube is located within an array formed by the plurality of slave lockers.

13. The modular locker system of claim 5, wherein the control cube is a locker.

* * * * *